Sept. 26, 1961 N. C. WEARSCH ET AL 3,002,017
METHOD FOR PREPARING ACRYLIC ACID
Filed July 13, 1959

INVENTORS
NORMAN C. WEARSCH
BY ANTHONY J. DE PAOLA

*Stephen Norman*
ATTY.

3,002,017
METHOD FOR PREPARING ACRYLIC ACID

Norman C. Wearsch, Avon, and Anthony J. De Paola, Lorain, Ohio, assignors to The B. F. Goodrich Company, New York, N.Y., a corporation of New York
Filed July 13, 1959, Ser. No. 826,768
6 Claims. (Cl. 260—526)

This invention relates to a method for preparing acrylic acid from beta-propiolactone and more particularly pertains to a method for preparing acrylic acid by depolymerizing a homopolymer of beta-propiolactone at elevated temperatures, removing the acrylic acid vapors from the depolymerizing system and quenching the acrylic acid vapors with pre-cooled acrylic acid.

The step of pyrolyzing or depolymerizing a homopolymer of beta-propiolactone to yield acrylic acid is known. However, because of the known propensity of acrylic acid toward polymerization at elevated temperatures, numerous precautions are taken to obtain the monomeric acid by the process heretofore employed. Among the precautions are the addition of a stabilizer or polymerization inhibitor such as copper, methylene blue or the monomethyl ether of hydroquinone in the pyrolyzing system and to the receiver for the monomer. Also, the pyrolyzing equipment is lined with copper and any condensing equipment is backed with the polymerization inhibiting metal. Another procedure for pyrolyzing a homopolymer of beta-propiolactone to produce acrylic acid is to use an inert diluent during the pyrolysis. Frequently, however, the acrylic acid is contaminated with such diluent or the diluent adds substantially to the cost of producing the desired monomeric acrylic acid.

It has now been found that if the acrylic acid vapors are quenched with pre-cooled glacial acrylic acid there is practically no polymerization of acrylic acid and the depolymerization of the homopolymer of beta-propiolactone can be carried out continuously over very extended periods of time at temperatures of from about 115 to about 250–260° C., even without the use of an acrylic acid polymerization inhibitor in either the pyrolyzing equipment or the quenching equipment. The temperature of the acrylic acid used for quenching can range from about −10° C. to about 70° C. depending on the rate of circulation, but control of the quench is more readily obtained if the acrylic acid is maintained at a temperature of from about 10° C. to about 45–50° C.

Depolymerization of the beta-propiolactone homopolymer can be effected at temperatures as low as about 115° C. if the process is carried out under vacuum or it can be as high as 260° C. if carried out under atmospheric pressure.

Figure 1:
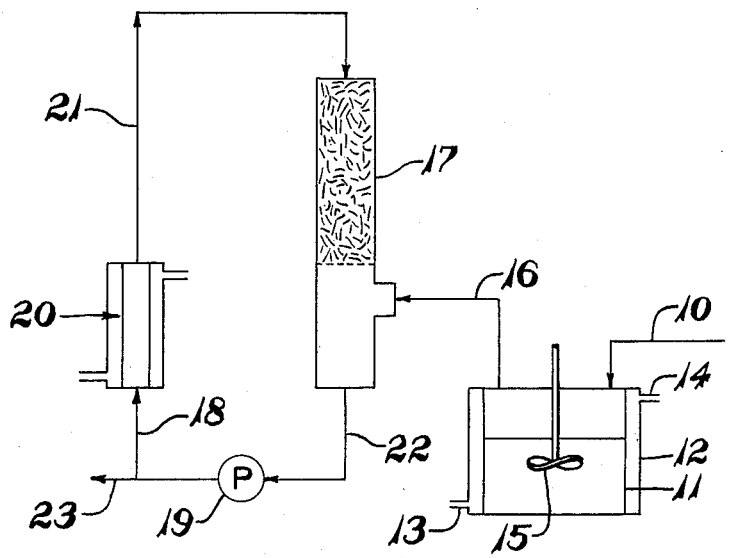
FIG. 1 is a schematic form of one type of apparatus that can be employed for practicing the process of this invention.

The polymerization of beta-propiolactone can be effected in many ways, including subjecting the monomer to heat, pressure, actinic light or through the use of well known substances which are termed here as polymerization catalysts. The most convenient method of polymerizing the lactone is by heating it either in bulk or in solution in the presence of either an alkaline or acid catalyst. Among the alkaline materials which will cause polymerization or condensation are potassium carbonate, sodium carbonate, potassium acetate, sodium hydroxide, sodium cyanide, ammonia, pyridine, quinoline, trimethyl amine, triethanol amine, and numerous other compounds which are alkaline in nature. Acidic polymerization or condensation catalysts include Friedel-Crafts type catalysts such as zinc chloride, aluminum chloride, aluminum bromide, boron trifluoride, iron chloride, stannic chloride or complexes of these compounds with organic compounds such as ethyl ether, ethyl chloride, propyl chloride or amines, and acids such as HCl, $H_2SO_4$, $H_3PO_4$ and other strong organic or inorganic acids.

The preferred method of preparing the lactone homopolymer is to heat the monomer to a temperature of 100–150° C. in the presence of about 1% sodium carbonate.

Referring now to the drawings, beta-propiolactone homopolymer is fed through line 10 into depolymerizer or pyrolizer 11, which has a jacket 12, containing an inlet 13, and outlet 14 for circulating a heating fluid, such as steam, hot oil or any other heating medium. It is apparent, of course, that the depolymerizer can be heated with electric resistance elements or by any other commonly known means. During the heating step the homopolymer is agitated by means of stirrer 15, to improve the heat transfer, because the homopolymer is normally a fairly viscous liquid. As the homopolymer undergoes decomposition or pyrolysis, vapors of substantially anhydrous acrylic acid are formed. These are removed through line 16 and enter a short column 17, which can be packed with Berl saddles, glass chips, or other inert materials, or it may contain no packing whatever. At the start of operations pre-formed glacial acrylic acid is added at a point in line 18, ahead of pump 19, which moves the acrylic acid through heat exchanger 20 where the acid is cooled to a temperature of −10 to 70° C., preferably 10 to 40–50° C. The cooled acid passes through line 21 and enters the top of column 17 in a direction counter to the flow of the acrylic acid vapors entering the column. The contact of the cooled acrylic acid with the vapors causes immediate condensation of the latter. The liquid acrylic acid flows to the bottom of the column and enters line 22 to enter the pump. When sufficient acrylic acid is available to keep the heat exchanger and line 21 at adequate volume for cooling purposes, the excess passes through line 23 to storage.

Figure 2:
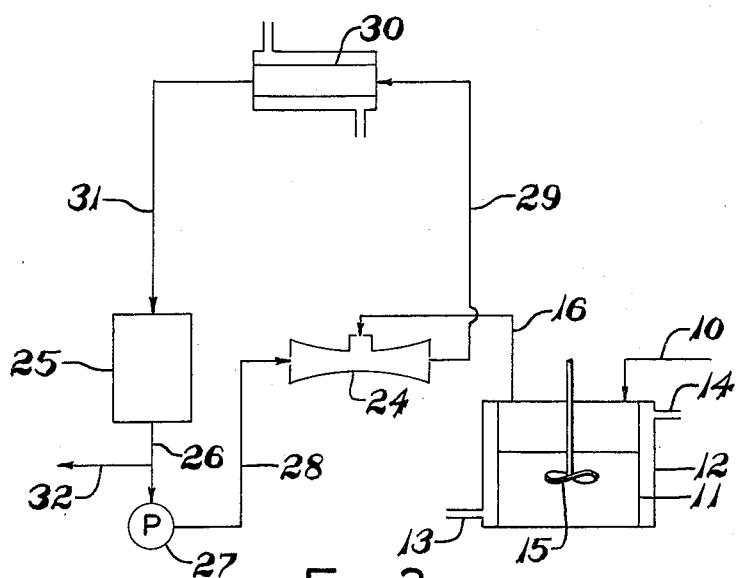
FIG. 2 is a schematic drawing of another type of apparatus in which an eductor is employed in the quench system.

FIG. 2 shows a modified apparatus and process for preparing glacial acrylic acid. The homopolymer of beta-propionitrile is depolymerized in a manner similar to that shown in FIG. 1. Vapors of monomeric glacial acrylic acid pass through line 16 into an eductor 24. Pre-cooled glacial acrylic acid from tank 25, is passed through line 26 to a pump 27 and through a line 28 to eductor 24. The eductor acts as a type of venturi tube and effects a slight vacuum which tends to draw the vapors into the liquid acrylic acid so that acrylic acid vapor is mixed with the cooled liquid acrylic acid. The mixture is then passed through line 29 into a heat exchanger where it is cooled further and then passed into line 31 into storage tank 25. As the reservoir of cooled acrylic acid, greater in amount than that necessary to cool the vapors is built up in the storage tank, the excess can be withdrawn through line 32. There is no critical rate of flow of cooled acrylic acid through the eductor other than that it must not be so great as flood and thus pass through line 16 back into the depolymerizer.

In either system the apparatus can be operated at atmospheric pressure or under vacuum. Because of economy it is preferred to operate the system at atmospheric or autonomous pressure. It is also obvious, that the entire process can be run either as a batch or as a continuous process. For normal operations a continuous process is preferred.

In some instances when the purity of the homopolymer of beta-propiolactone contains volatile impurities, these can be stripped from the homopolymer by steam before running the polymer into the depolymerizing unit.

The following examples are intended to illustrate the invention but are not intended as limitations.

EXAMPLE I

In this run the apparatus described in FIG. 1 was used. 500 ml. of a homopolymer of beta-propiolactone were added to the depolymerizer. The homopolymer was then heated using dioctyl phthalate as a heat exchange medium. 650 ml. of glacial acrylic acid, pre-cooled to a temperature of 14° C., were added to the heat exchanger for use as a quench medium for acrylic acid vapors coming from the depolymerized beta-propiolactone. The quenching acid was sprayed into the top of the cooling column which was packed with ½ inch Berl saddles. This run was continued for about 6 hours. Data obtained in the run are recorded in the following table.

Table I

| Time of Operation, Hrs. | Temp. of Dioctyl Phthalate, ° C. | Vapor Temperature, ° C. | Temp. at Bottom of Quench Column, ° C. | Temp. at Top of Quench Column, ° C. | Ml. Lactone Polymer Fed | Ml. Acrylic Acid |
|---|---|---|---|---|---|---|
| 1 | 205–235 | 95–152 | 13–14 | 12–14 | | 50 |
| 2 | 235–256 | 152–154 | 12–13 | 11–12 | 500 | 300 |
| 3 | 244–256 | 154–168 | 13–18 | 11–16 | 500 | 400 |
| 4 | 248–260 | 158–160 | 11–14 | 10–13 | | 250 |
| 5 | 254–260 | 154–158 | 11–12 | 10–11 | | 200 |
| 5½ | | | | | 500 | |
| 6 | 245–254 | 154 | 12–13 | 11–12 | | 350 |

The beta-propiolactone polymer used in this run was made from beta-lactone monomer which was about 80–85% pure. The polymer was steam stripped before use. The acrylic acid obtained from depolymerization of the lactone analyzed 98.8% total acid and 98.0% acrylic acid. No polyacrylic acid was found in the system at the end of the run.

EXAMPLE II

In this run the apparatus of FIG. 2 was used. To the depolymerizer were added 800 ml. of a homopolymer of beta-propiolactone. The homopolymer was heated to about 183–185° C. at which temperature the polymer depolymerized to form vapors of glacial acrylic acid. Each half hour during the run of about fifteen hours some make-up beta-propiolactone homopolymer pre-heated to 90–120° C. was added to the depolymerizer. The temperature of the acrylic acid used for quenching purposes ranged from 15 to 26° C. and the temperature of the quenched liquid ranged from 17 to 26° C. In order to provide a severe test for the process, the acrylic acid vapor, as it left the depolymerizer, was heated to a temperature ranging from 190 to 232° C. But even under these undesirable conditions, the use of an eductor through which cold, liquid acrylic acid was passed, provided means for removal of heat vapors from the heating zone quite rapidly. After the fifteen hour run, the equipment was observed carefully, but no sign of any polyacrylic acid was apparent in any part of the system.

EXAMPLE III

In this run steam stripped homopolymer was pumped into the depolymerizer of the apparatus of FIG. 2 at a temperature of about 105° C. The system was maintained under a vacuum of 56–76 mm. Almost immediately vapors of acrylic acid were apparent. However, the temperature in the depolymerizer was increased to 135–145° C. to speed up the depolymerization. Cooled acrylic acid at a temperature of about 19° C. was pumped through the eductor. The temperature at the outlet of the eductor was held at about 40–42° C., by controlling the rate of flow of the cooled acrylic acid. This run was continued for about 172 hours without noticeable polyacrylic acid deposition on the surfaces of the equipment.

EXAMPLE IV

In another run using a procedure similar to that described in Example III, steam stripped homopolymer was maintained at a temperature of 151–167° C. in the depolymerizer. A vacuum of 106–210 mm. was maintained on the system. The temperature of acrylic acid entering the eductor was 21–25° C. and that at the exit of the eductor was 30–44° C. In this run which was continued for 47 hours, all the acrylic acid had a purity of 97% or higher. No polyacrylic acid formed during the run.

EXAMPLE V

In another continuous run, a vacuum of 30–90 mm. Hg was drawn on the system of FIG. 2. The depolymerizing temperature was 137–145° C. The temperature of the acrylic acid entering the eductor ranged from 18–23° C. and at the outlet it ranged from 38–45° C.

There was no visible evidence of any polymerization of acrylic acid in any of these runs. On the contrary, when 2.2 pounds of a beta-propiolactone homopolymer was depolymerized by heat at 172–215° C. and vapor temperature of 131–176° C., which were condensed in a glass, water cooled condenser, without circulating pre-cooled acrylic acid, 0.1 pound of polyacrylic acid formed on the walls of the condenser in a period of only 4 hours.

If the apparatus shown in FIG. 1 is employed, it is preferable, but not essential to distribute or spray the cooled acrylic acid into the top of the cooling column in a direction counter to the flow of vapors. The rate of flow of the quenching acrylic acid through either system will depend on the temperature and amount of the vapors entering the quench column, and on the temperature of the quenching acrylic acid. If the acrylic acid monomer coming from the depolymerizer is cooled rapidly to about 70° C. or lower, preferably 10–45° C., it usually will not polymerize on condensation. The acid used for cooling can be at —10 to about 65–70° C. Although —10 is below the freezing point of highly pure acrylic acid, the glacial acrylic acid used in this system can be super cooled for short periods of time without crystallization.

We claim:

1. In a method of preparing glacial acrylic acid monomer by depolymerization at a temperature of from about 115 to about 260° C. of a homopolymer of beta-propiolactone, the step of rapidly quenching vapors of acrylic acid monomer by condensation with sufficient pre-cooled acrylic acid to reduce the temperature below 70° C.

2. The process of claim 1 in which the temperature is reduced to 10–45° C.

3. The process of claim 1 in which the pre-cooled acrylic acid is fed into the cooling area in a direction counter to the flow of the acrylic acid vapors entering a cooling column.

4. The process of claim 1 in which the pre-cooled acrylic acid and acrylic acid vapors are co-mingled in an eductor.

5. The method of claim 1 in which the reaction is carried out at autogenous pressure.

6. The method of claim 1 in which the reaction is carried out at a pressure below atmospheric.

References Cited in the file of this patent

UNITED STATES PATENTS

| 1,993,886 | Jaeger et al. | Mar. 12, 1935 |
| 2,361,036 | Kung | Oct. 24, 1944 |